(12) United States Patent
Rachakonda et al.

(10) Patent No.: US 7,877,619 B2
(45) Date of Patent: Jan. 25, 2011

(54) POWER MODE CONTROL METHOD AND CIRCUITRY

(76) Inventors: Ramana Rachakonda, 12013 Lake Stone Dr., Austin, TX (US) 78738; Blaise Fanning, 989 Smith Way, Folsom, CA (US) 95630; Anil K Sabbavarapu, 2939 Lantana Ridge Dr., Austin, TX (US) 78732; Belliappa M. Kuttanna, 1100 Bexley La., Austin, TX (US) 78739; Rajesh Patel, 9313 Silk Oak Cove, Austin, TX (US) 78748; Kenneth D. Shoemaker, 10925 Stonebrook Dr., Los Altos Hills, CA (US) 78748; Lance E. Hacking, 9301 La Puente Dr., Austin, TX (US) 78749; Bruce L. Fleming, 2210 E. Lynx Pl., Chandler, AZ (US) 85249; Ashish V. Choubal, 12209 Salida Del Sol Pass, Austin, TX (US) 78732

( * ) Notice: Subject to any disclaimer, the term of this patent is extended or adjusted under 35 U.S.C. 154(b) by 590 days.

(21) Appl. No.: 11/967,920

(22) Filed: Dec. 31, 2007

(65) Prior Publication Data

US 2009/0172429 A1 Jul. 2, 2009

(51) Int. Cl.
*G06F 1/26* (2006.01)
*G06F 1/00* (2006.01)
(52) U.S. Cl. .................. 713/310; 713/330; 713/340
(58) Field of Classification Search .................. 713/310
See application file for complete search history.

(56) References Cited

U.S. PATENT DOCUMENTS

| | | | | |
|---|---|---|---|---|
| 5,251,320 | A * | 10/1993 | Kuzawinski et al. | 713/324 |
| 6,498,523 | B1 * | 12/2002 | Gebara | 327/143 |
| 7,051,218 | B1 * | 5/2006 | Gulick et al. | 713/310 |
| 7,290,127 | B2 * | 10/2007 | Schmisseur et al. | 713/2 |
| 7,519,839 | B2 * | 4/2009 | Diefenbaugh et al. | 713/300 |
| 2007/0079162 | A1 * | 4/2007 | Mundada et al. | 713/330 |
| 2008/0091959 | A1 * | 4/2008 | Yu et al. | 713/300 |
| 2008/0191331 | A1 * | 8/2008 | Lee et al. | 257/679 |
| 2010/0188133 | A1 * | 7/2010 | Burdett | 327/365 |

* cited by examiner

*Primary Examiner*—Ryan M Stiglic
(74) *Attorney, Agent, or Firm*—Eric R. Nordstrom

(57) ABSTRACT

In some embodiments, a power up (or power mode) interface is provided whereby a chip's power up signals are encoded into multiple states to provide more functions than the number of signals used to define the states.

20 Claims, 2 Drawing Sheets

POWER MODE CONTROL METHOD AND CIRCUITRY

BACKGROUND

The present invention relates generally to an external power mode control method and circuitry and in particular, to external control of chip power up states.

FIG. 1 shows a block diagram of a conventional approach for controlling chip power up (including wake up) of a chip in a computer platform. Depicted are first and second chips, 102 and 112 respectively, coupled together, among other ways, via power up signals. For example, the first chip could be an I/O hub controller, and the second chip could be a graphics hub controller in a mobile platform system. The power up signals typically include signals such as power good, reset, and low power state indication signals that are appropriately asserted and deasserted to properly start up the second chip.

In operation, chip 1 comes up first, e.g., when the platform power is turned on, and once it is powered up, it then controls chip 2 to come up. (Not all of the chips in a computer platform are shown for simplicity, but others such as a processor chip could also be included.) The power up signals are implemented with separate pins in the first and second chips, which unfortunately, can limit the different things that can be done at power up due to limited pin resources. With such limited power-up functionality, there may be various problems such as reliability issues. For example, with many chips, sometime, while power up is occurring, the second chip may sense one or more of its fuse settings, e.g., for operating conditions or to provide to other chips. Unfortunately, depending on how the fuses are sensed, they can be sensed for too long, resulting in possible degradation over the life of the chip. Accordingly, new approaches may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In some embodiments described herein, a power up (or power mode) interface is provided whereby a chip's power up signals are encoded into multiple states to provide more functions than the number of signals used to define the states. Among other things, this may save pins because various different tasks can be defined within each of the states. This allows for additional power up tasks such as limiting the time that fuses are sensed and driving alternate voltage identification (VID) command values on the pins for different voltages on the chip. In some embodiments, a state machine may be used, which simplifies the description of flow and avoids confusion on valid chip start-up sequence. That is, it allows for specification of the time spent in each state and valid transitions between states to be more explicitly defined. In some embodiments, the state machine may be "one hot" encoded to avoid causing glitches on the internal signals.

Figure 1:
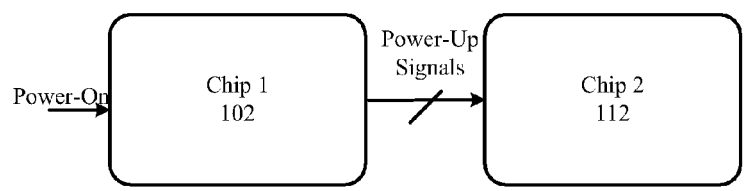
FIG. 1 shows a conventional power mode interface.
Figure 2:
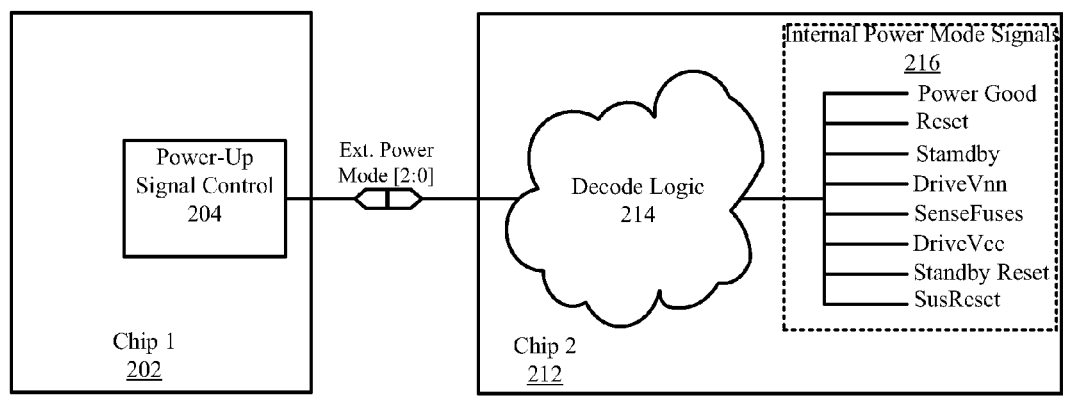
FIG. 2 is a block diagram of a power mode interface in accordance with some embodiments.

FIG. 2 is a block diagram of a second chip 212 coupled to a first chip through a power mode interface to control it for powering up. In this depiction, the power mode interface comprises three signal lines (External Power Mode [2:0]). The signals for these three lines (e.g., pins) are generated by a power up signal control unit 204 in the first chip 202.

The second chip comprises decode logic 214 to control internal power mode signals 216 within the second chip. In the depicted embodiment, the internal signals comprise eight signals (Power Good, Reset, Standby, Drive Vnn, Sense Fuses, Drive Vcc, Standby Reset, and SusReset), any combination of which may be appropriately asserted or deasserted in the eight different states ('000, '001 . . . '111) defined by the three external power mode signals.

The chips could correspond to any suitable chips including but not limited to computer platform chips such as processor chips, controller hubs (memory, I/O, graphics, and/or integrated combinations of the same), and the like. The power up signal control unit 204 may be implemented with any suitable circuit, component, or combination thereof to implement a state machine defining a desired power up routine to control power up signals such as the external power mode signals in the figure. For example, it could be implemented with software in a controller or processor, a logic circuit formed from sequential and/or combinational logic components, or any other suitable combination of logic and analog timing components.

The decode logic 214 comprises logic to generate an appropriate combination of assertions and deassertions for the internal power mode signals 216 based on the applied state as defined by the external signals. It should be appreciated that while eight internal power up signals are shown, any number could be controlled, in this depiction, for the eight different power mode states. Similarly, in this embodiment, the three external signal lines translate to eight different states, but additional or less states (or modes) could be attained by adding or removing external signal lines. In addition, the decode logic 214 may include additional circuitry such as glitch filters or other suitable circuits to enhance signal integrity.

Figure 3:
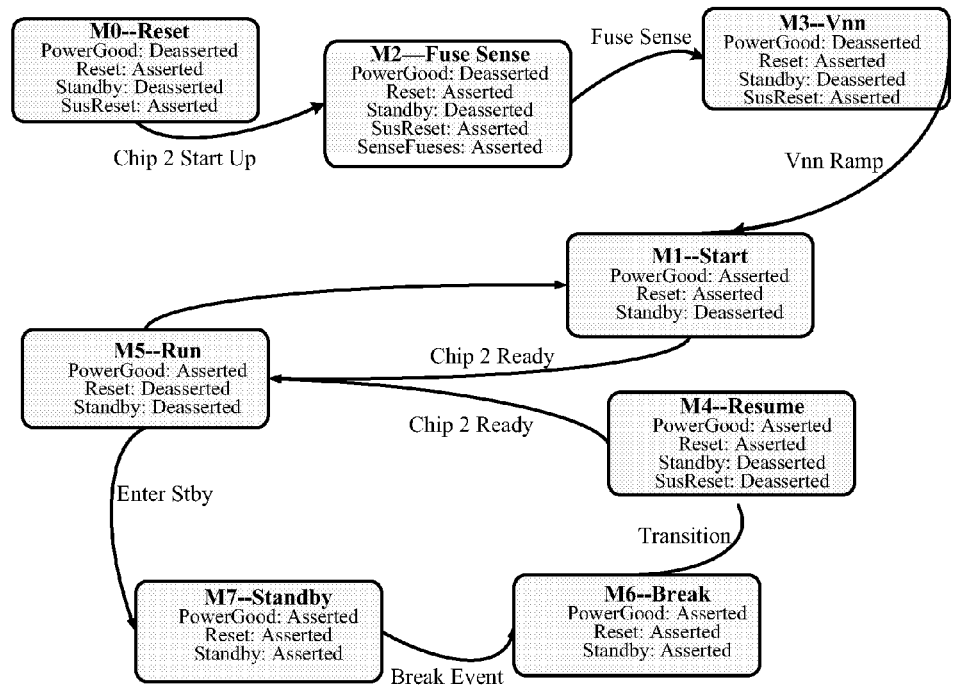
FIG. 3 is a power mode transition state diagram in accordance with some embodiments.

FIG. 3 shows a state diagram for the power mode interface of FIG. 2 in accordance with some embodiments. it defines eight different power up modes (M0 to M7) for the eight different states defined by the three external signals, as generated and controlled by the power up signal control unit 204. It defines allowed transitions and signal values for some of the internal power mode signals. The state diagram illustrates how the signal control circuit 204 drives the three external signals to assist chip 2 out of different deactivation modes, e.g., cold, warm or standby modes. There may be certain time requirements before transitioning from one state to the other. These are indicated with exemplary values listed in Table 1 below. Table 2 shows exemplary states (or modes) with supply voltage values for chip 2, and Table 3 shows exemplary internal power signal values for the different power modes.

TABLE 1

Exemplary Transition Duration Limits

| Transition Label | State Transition | Min Value | Max Value | Description |
|---|---|---|---|---|
| Chip 2 Start Up | M0 → M2 | 25 μSec. | — | Time it takes Chip 1 to come up and load settings, e.g., from NAND flash |
| Fuses Sense | M2 → M3 | 1 μSec. | 2 μSec. | Time it takes for Chip 2 fuses to be sensed and stable |
| Vnn Ramp | M3 → M1 | 45 μSec. | 2 mSec. | Time it takes for Vnn to drop from the default value to the fuse specified value |
| Chip 2 Ready | M1 → M5, M4 → M5 | 25 μSec. | 1 mSec. | Time it takes for Chip 2 Startup tasks, e.g., PLL lock, RComp, to complete |
| Enter Stby | M5 → M7 | — | — | Going into standby |
| Break Event | M7 → M6 | 25 μSec. | — | Break event occurred |
| Transition | M6 → M4 | 1 μSec. | 1 mSec. | Transitionary |

TABLE 2

Exemplary States (or Modes) with Supply States

| State Name | Ext Power Mode[2:0] | VID | BSEL | Vnn | Vcc |
|---|---|---|---|---|---|
| Reset | 000 | x | Default | Default | |
| Fuse Sense | 010 | x | Default | Default | |
| Vnn | 011 | 0(83)/1(100) | Vnn | Default | |
| Start | 001 | x | Vnn | Vcc | |
| Run | 101 | x | Vnn | Vcc | |
| Standby | 111 | x | Vnn | off | |
| Break | 110 | x | Vnn | off | |
| Resume | 100 | x | Vnn | Vcc | |

TABLE 3

Exemplary Internal Signal values For Different States

| Internal Signals | M0 | M2 | M3 | M1 | M5 | M7 | M6 | M4 |
|---|---|---|---|---|---|---|---|---|
| Power Good | 0 | 0 | 0 | 1 | 1 | 1 | 1 | 1 |
| Reset | 1 | 1 | 1 | 1 | 0 | 0 | 0 | 0 |
| Standby Reset | 0 | 0 | 0 | 0 | 0 | 1 | 1 | 1 |
| Standby | 0 | 0 | 0 | 0 | 0 | 1 | 1 | 0 |
| SusReset | 1 | 1 | 1 | 0 | 0 | 0 | 0 | 0 |
| Sense Fuses | 0 | 1 | 0 | 0 | 0 | 0 | 0 | 0 |
| Drive Vnn | 0 | 0 | 1 | 0 | 0 | 0 | 0 | 0 |
| Drive Vcc | 0 | 0 | 0 | 1+ | 1 | 0 | 0 | 0 |

Figure 4:
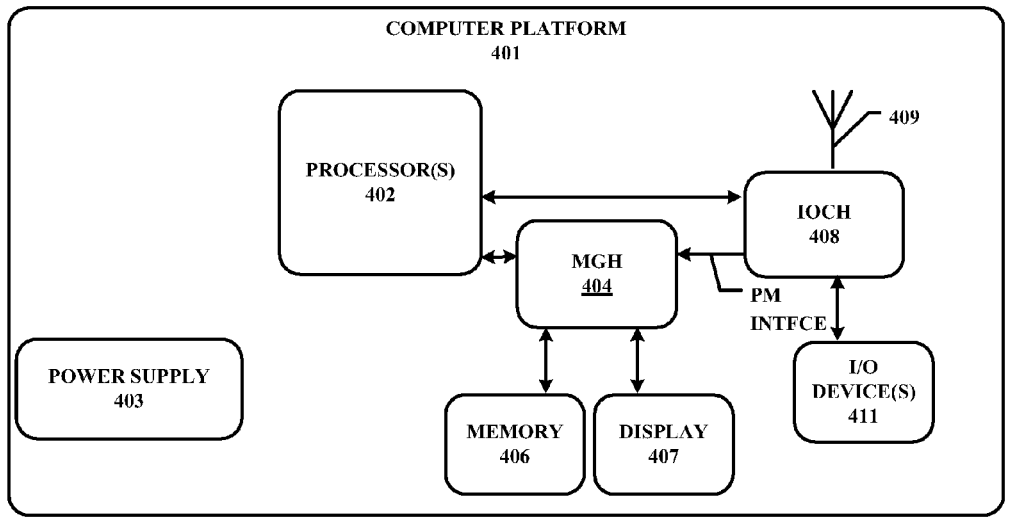
FIG. 4 is a block diagram of a computer system having one or more chips with a power mode interface in accordance with some embodiments.

With reference to FIG. 4, one example of a portion of a mobile platform (e.g., computing system such as a mobile personal computer, PDA, cell phone, or the like) is shown. The represented portion comprises one or more processors 402, power supply 403, memory and graphics control hub (MGH) 404, memory 406, display 407, I/O control hub 408, antenna 409, and I/O devices 411. The power supply 403, which may include one or more AC adaptors, batteries, and/or DC-DC voltage regulators, provides DC supplies to the platform components.

The processor(s) 402 is coupled to the memory 406 and display 407 via the MGH chip 404 and to the I/O devices 411 and antenna 409 via the IO hub chip 408. The antenna allows the processor and thus the platform to be coupled to a wireless network.

The IO hub 408 is coupled to the MG hub 404 via a power mode interface such as the interface described above. When the platform is powered up, the IO hub first comes up, then it controls the MG hub 404 to come up via the power interface. The MG hub 404 may next, in a similar fashion, bring up the processor 402.

The mobile platform 401 may implement a variety of different computing devices or other appliances with computing capability. Such devices include but are not limited to laptop computers, notebook computers, personal digital assistant devices (PDAs), cellular phones, audio and/or or video media players, and the like. It could constitute one or more complete computing systems or alternatively, it could constitute one or more components useful within a computing system.

In the preceding description, numerous specific details have been set forth. However, it is understood that embodiments of the invention may be practiced without these specific details. In other instances, well-known circuits, structures and techniques may have not been shown in detail in order not to obscure an understanding of the description. With this in mind, references to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The term "PMOS transistor" refers to a P-type metal oxide semiconductor field effect transistor. Likewise, "NMOS transistor" refers to an N-type metal oxide semiconductor field effect transistor. It should be appreciated that whenever the terms: "MOS transistor", "NMOS transistor", or "PMOS transistor" are used, unless otherwise expressly indicated or dictated by the nature of their use, they are being used in an exemplary manner. They encompass the different varieties of MOS devices including devices with different VTs, material types, insulator thicknesses, gate(s) configurations, to mention just a few. Moreover, unless specifically referred to as MOS or the like, the term transistor can include other suitable transistor types, e.g., junction-field-effect transistors, bipolar-junction transistors, metal semiconductor FETs, and various types of three dimensional transistors, MOS or otherwise, known today or not yet developed.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising: a control circuit to generate external power-up control signals to be coupled to a second chip to control the second chip to power up, the external power up control signals to define a plurality of different power-up states that each specify associated conditions for internal power-up signals for the second chip, wherein there are more power-up states than the number of external power-up control signals.

2. The chip of claim 1, in which the control circuit implements a finite state machine to transition between the power-up states in accordance with specified allowed transitions.

3. The chip of claim 2, in which the state machine is to transition between the power-up states in accordance with specified transition timing parameters.

4. The chip of claim 1, in which the control circuit controls the second chip to sense fuse values for a limited amount of time.

5. The chip of claim 1, in which the second chip has decode circuitry to decode the external power-up signals into one of the different power-up states.

6. The chip of claim 5, in which the decode circuitry comprises glitch filters to filter noise from the internal power-up signals.

7. The chip of claim 1, in which the internal power-up signals include a power good, a voltage identification (VID), and a fuse sense signal.

8. The chip of claim 1, in which the second chip is a hub control chip for a computing platform.

9. A chip, comprising: decode circuitry to decode external power-up control signals into one of a plurality of different power-up states based on the values of the external power-up control signals, wherein there are more power-up states than the number of external power-up control signals and wherein the plurality of different power-up states each specify associated conditions for internal power-up signals of the chip.

10. The chip of claim 9, in which the external power-up control signals are to control the decode circuitry to transition through the different states in accordance with state and transition specifications.

11. The chip of claim 9, in which the external power-up control signals are to come from a separate computer platform chip.

12. The chip of claim 10, in which the separate chip has a control circuit to implement a state machine in accordance with the state and transition specifications.

13. The chip of claim 9, in which the external power-up control signals control one or more fuses to be sensed for a limited amount of time.

14. A system, comprising: (a) a first chip having external power-up control pins; and (b) a second chip coupled to the first chip through the external power-up control pins and having decode circuitry to enable a power-up state based on the external power-up control pins, wherein there are more power-up states than the number of external power-up control pins, wherein there are more power-up states than the number of external power-up control signals.

15. The system of claim 14, in which the first chip has a control circuit to implement a state machine to generate external power-up control signals for the external power-up control pins to control power-up of the second chip.

16. The system of claim 14, comprising a processor and an antenna to couple the processor to a wireless network.

17. The system of claim 16, in which the antenna is coupled to the processor through the first chip.

18. The system of claim 14, in which the first chip controls the second chip to sense fuse values for a limited amount of time.

19. The system of claim 14, in which the decode circuitry includes one or more glitch filters to filter noise from internal power-up signals in the second chip.

20. The system of claim 19, in which the internal power-up control signals include a voltage identification (VID), a fuse sense, and a standby signal.

* * * * *